(12) United States Patent
Muxlow

(10) Patent No.: US 7,219,468 B1
(45) Date of Patent: May 22, 2007

(54) AUTOMATIC WATERING DEVICE FOR HANGING BASKETS AND PLANTER BOXES

(76) Inventor: Maurice A. Muxlow, #115 - 1450 McCallum Road, Abbotsford, BC (CA) V2S 8A5

( * ) Notice: Subject to any disclaimer, the term of this patent is extended or adjusted under 35 U.S.C. 154(b) by 58 days.

(21) Appl. No.: 11/098,851

(22) Filed: Apr. 4, 2005

Related U.S. Application Data

(60) Provisional application No. 60/558,924, filed on Apr. 2, 2004.

(51) Int. Cl.
*A01G 9/02* (2006.01)
*F16K 7/04* (2006.01)

(52) U.S. Cl. ............... 47/67; 47/48.5; 47/79; 251/9; 251/10; 248/317; 137/403

(58) Field of Classification Search ............... 47/67, 47/83, 82, 79, 86, 48.5; 251/9, 10
See application file for complete search history.

(56) References Cited

U.S. PATENT DOCUMENTS

| | | | |
|---|---|---|---|
| 1,063,395 A | | 6/1913 | Scribner |
| 1,876,988 A | * | 9/1932 | Lormor .................. 251/9 |
| 2,066,169 A | * | 12/1936 | Zwosta .................. 141/196 |
| 2,198,309 A | * | 4/1940 | James .................. 177/117 |
| 2,512,839 A | * | 6/1950 | Pruitt .................. 137/408 |
| 2,541,622 A | * | 2/1951 | Toadvine .................. 137/408 |
| 2,588,212 A | | 3/1952 | Willis |
| 2,620,829 A | * | 12/1952 | Tolley .................. 251/233 |
| 2,746,481 A | * | 5/1956 | Coan .................. 137/408 |
| 3,108,400 A | | 10/1963 | Wolfe, Jr. |
| 3,293,799 A | | 12/1966 | Keller et al. |
| 3,368,579 A | * | 2/1968 | Godshalk .................. 137/403 |
| 3,438,604 A | | 4/1969 | Spicer |
| 3,530,877 A | * | 9/1970 | Henry .................. 137/408 |

(Continued)

FOREIGN PATENT DOCUMENTS

GB 2095083 3/1981

(Continued)

*Primary Examiner*—Andrea M. Valenti
(74) *Attorney, Agent, or Firm*—Todd N. Hathaway

(57) ABSTRACT

An apparatus for automatically watering a plant in a container by regulating a flow of water to the container through flexible tubing. Upper and lower jaw members are interconnected by a horizontal pivot axis so that they develop a scissors action. A jaw area is formed on one side of the pivot axis for receiving the flexible plastic tubing, and a compression spring is mounted on the opposite side to provide resistance to closing of the jaw area. For use with pots and other non-hanging containers, the container is rested atop the upper jaw member on the side towards the jaw area so that the weight of the container acts directly to compress and close the jaw area. Baskets and other hanging containers are suspended from the other ends of the jaw members so that the tension caused by the weight of the container causes the jaw area to pivot closed. Drying of the container reduces its weight so that the spring forces the jaw area open and allows water to flow through the tubing; as water flows into the container, the increased weight causes the jaw area to close and pinch off flow through the tubing. The device is adjustable by increasing/decreasing compression of the spring so as to increase/decrease resistance to closing of the jaw area.

13 Claims, 4 Drawing Sheets

U.S. PATENT DOCUMENTS

| | | | |
|---|---|---|---|
| 3,967,578 A * | 7/1976 | Gallo | 116/296 |
| 4,240,538 A * | 12/1980 | Hawkes et al. | 198/358 |
| 4,241,538 A | 12/1980 | Lahr | |
| 4,516,533 A | 5/1985 | Mallinson | |
| 4,562,959 A | 1/1986 | Pointer, Jr. | |
| 4,760,666 A | 8/1988 | Han | |
| 4,825,591 A | 5/1989 | Han | |
| 4,848,029 A | 7/1989 | Han | |
| 5,079,869 A * | 1/1992 | Dawson | 47/67 |
| 5,848,494 A | 12/1998 | Spelt | |
| 6,161,329 A | 12/2000 | Spelt | |
| 6,536,738 B2 | 3/2003 | Inoue et al. | |
| 6,845,588 B2 * | 1/2005 | Muxlow | 47/67 |
| 2004/0045218 A1 | 3/2004 | Muxlow | |

FOREIGN PATENT DOCUMENTS

| | | | |
|---|---|---|---|
| GB | 2079410 A * | 7/1981 | |
| GB | 2268594 A * | 1/1984 | |
| GB | 2190573 | 11/1987 | |
| GB | 2246418 | 1/1992 | |
| GB | 2267552 | 12/1993 | |
| GB | 2287632 | 9/1995 | |
| GB | 2305591 | 4/1997 | |

* cited by examiner

AUTOMATIC WATERING DEVICE FOR HANGING BASKETS AND PLANTER BOXES

RELATED APPLICATIONS

This application claims the benefit of U.S. Provisional Patent Application No. 60/558,924 filed on 2 Apr. 2004.

BACKGROUND OF THE INVENTION a. Field of the Invention

The present invention relates generally to automatic watering devices for plants in containers, and, more particularly, to a gravity-actuated automatic watering apparatus that is capable of use with either hanging baskets or planter boxes/pots.

b. Related Art

Both hanging baskets and planter boxes require frequent watering, or else the flowers or other plants therein will quickly wither and die. This is true in moderate as well as hot climates, since such containers hold a relatively small volume of soil and are exposed on all sides, and therefore suffer rapid loss of moisture through evaporation. Moreover, hanging baskets and planter boxes are frequently located under eaves, trees or other features that obstruct or limit their access to rain water.

The need for frequent and routine watering places a significant burden on the homeowner or gardener. The burden is especially difficult for persons who are subject to busy work schedules, as well as for the elderly and persons having limited mobility. Moreover, the situation can become acute if the person is absent for a significant period of time—when away on holiday, for example—unless the person can enlist the temporary services of a neighbor, friend or family member to tend to the watering.

These difficulties have, of course, been well known, and a number of solutions have been proposed over the years. While often effective in the sense of being able to achieve a degree of watering on an automatic basis, none have represented an entirely satisfactory solution.

Certain of these prior devices have relied on electrically-updated valves and controls. This approach has become increasingly common in recent years, however, it remains prohibitively expensive to provide a valve and electric controller for each basket or planter box; moreover, to do so would require running not only a water line but also an electrical cord to each and every planter box and hanging basket. Certain electrically-operated systems have been developed that employ a central controller and valve assembly from which irrigation tubing is routed to individual destinations, however, this means that a multitude of tubes must be routed from their origin (typically, a garage or basement location) to the various plants. Moreover, most such systems employ watering routines that based on some form of a timer. As a result, the container receives water on a periodic basis regardless of whether it is needed. The rates at which hanging baskets and planter boxes lose moisture vary with factors (temperature, humidity, wind speed and so on) that fluctuate tremendously, so that water needs cannot be predicted as a function of time alone; a timer-based system may therefore supply water when it is not needed or vice-versa. The water requirement of different types of plants are often quite specific (some preferring wetter soil and others preferring comparatively dry conditions) and so over-watering and under-watering caused by a timer-based system can be not only wasteful but also potentially catastrophic to the health of the plants. Electronic sensors for determining soil moisture are known, but their potential for use in conjunction with a system for watering hanging baskets and planter boxes is severely restricted by cost and complexity.

Other automatic watering devices have been developed that do not rely on electrical power for their operation and are therefore free from some of the complications noted above. However, a satisfactory solution has remained elusive.

A few such non-electric devices have relied on structures or materials having physical characteristics that respond in some way to changes in moisture—for example, the swelling of a piece of wood—but as a group such mechanisms exhibit poor reliability and long-term durability. Others have been actuated by changes in weight as the amount of water in the container increases/decreases, which offers the prospect of far more reliable operation, however, the mechanisms have generally been deficient for a number of reasons. For example, many of the gravity-operated mechanisms have been excessively complex and/or cumbersome, so that they are too bulky and too expensive to be used with individual hanging baskets or boxes, especially where a yard contains a number of baskets or planter boxes. The bulky, visually obtrusive appearance of many of these devices also renders them unsatisfactory from an aesthetic standpoint. Moreover, many of the mechanically operated devices are intended to operate in conjunction with an associated reservoir (e.g., a small water tank), which is only a partial solution, since the homeowner must replenish the reservoir itself on a periodic basis.

A few devices have been developed that take the more effective approach of controlling the flow of water through small-diameter tubing that can be connected to a tap or other pressure source and strung unobtrusively along an eave or other support. One example is that shown in GB 2,190,573 to Jones: the Jones device is actuated by the weight of a hanging basket, and uses a cylindrical, reciprocating mechanism to control the flow of water through tubing that leads to the plant. The device is admirably compact, but its construction—using comparatively close tolerances and components that must be machined, cast or molded—renders the cost excessively high and also bodes ill for long term reliability in a garden environment, where dirt or debris are likely to accumulate within the interior of the mechanism and impair its operation. Moreover, the Jones device is limited to use with hanging baskets, and has no capacity for use with planter boxes or other containers that are not suspended from an overhanging support. Another example, that shown by U.S. Pat. No. 4,241,538 to Lahr, in some respects represents the converse situation: Lahr employs a simple and reliable mechanism in which the flexible tubing is squeezed between a pair of hinged lever arms beneath a planter box, with the flow being controlled by an adjustable spring mounted between the outer ends of the arms. This device, however, cannot be used with hanging baskets, and moreover, the manner in which it flattens a segment of tubing between the arms renders it somewhat difficult to achieve fine adjustments.

Accordingly, there exists a need for an apparatus for automatically watering plants in containers that is compact and reliable in operation. Furthermore, there exists a need for such an apparatus that operates effectively in conjunction with flexible, small-diameter tubing that can be routed unobtrusively to such containers. Still further, there exists a need for such an apparatus that is capable of being used with both hanging baskets and planter boxes. Still further, there exists a need for such an apparatus that is capable of very fine adjustment. Still further, there exists a need for such an apparatus that is inexpensive to manufacture and that is durable and long-lasting in use.

SUMMARY OF THE INVENTION

The present invention has solved the problems cited above, and is an apparatus for automatically watering plants in containers by regulating the flow of water through flexible plastic tubing.

Broadly the apparatus comprises: upper and lower jaw members interconnected by a horizontal pivot axis; opposing contact surfaces on said upper and lower jaw members that define a jaw area for receiving the flexible tubing therein; an adjustable spring for resiliently biasing the contact surfaces apart so as to open the jaw area; means for suspending a plant container from the lower jaw member on a side of the pivot axis opposite the jaw area; and means for supporting a plant container atop the upper jaw portion on a side of the pivot axis the same as the jaw area; so that in response to an increase of the weight of the container that is suspended from the lower jaw member or that is supported on the upper jaw member the members are rotated around the pivot axis so as to close the jaw area and pinch the flexible tubing closed, thereby restricting the flow of water therethrough, and so that in response to a reduction of the weight of the container due to water loss the members are counter-rotated by the adjustable spring so as to open the jaw area and allow the tubing to reopen, thereby reestablishing the flow of water through the tubing.

The first contact surface may comprise a comparatively broad surface for holding the flexible tubing generally flat thereon, and the second contact surface may comprise a comparatively narrow edge for pressing into the wall of the tubing so as to pinch the tubing closed. The first contact surface may comprise a lower surface of a web portion of the upper jaw member, and the second contact surface may comprise an upper edge of a wall portion of the lower jaw member.

The adjustable spring may comprise a leaf spring mounted to bear against the upper jaw member, and means for adjusting compression of the leaf spring. The means for adjusting the compression of the leaf spring may comprise a threaded shaft that extends through an opening in the coil spring and an adjuster wheel that is threaded on an upper end of the shaft for selectively increasing or decreasing compression of the spring between the wheel and the upper jaw member. The lower end of the threaded shaft may be mounted to the lower jaw member.

The means for suspending a plant container for the lower jaw member may comprise a depending hook member that is mounted to the lower jaw member. The apparatus may further comprise means for suspending the upper jaw member from an overhanging support. The means for suspending the upper jaw member from an overhanging support may comprise a bail member that is mounted to the upper jaw member on said side of said pivot axis opposite the jaw area. The means for supporting a plant container on the upper jaw member may comprise an upper surface of the jaw member.

The upper jaw member may comprise a downwardly facing channel-shaped member having a web portion and first and second depending wall portions. The lower jaw member may comprise an upwardly facing channel-shaped member having a web portion and first and second upwardly projecting wall portions that extend parallel to and fit within the depending wall portions of the upper jaw member. The pivot axis may comprise a pivot pin that extends through cooperating bores in the wall portions of the upper and lower jaw members.

These and other features and advantages of the present invention will be more fully understood from a reading of the following detailed description with reference to the accompanying drawings.

DETAILED DESCRIPTION a. Overview

Figure 1:
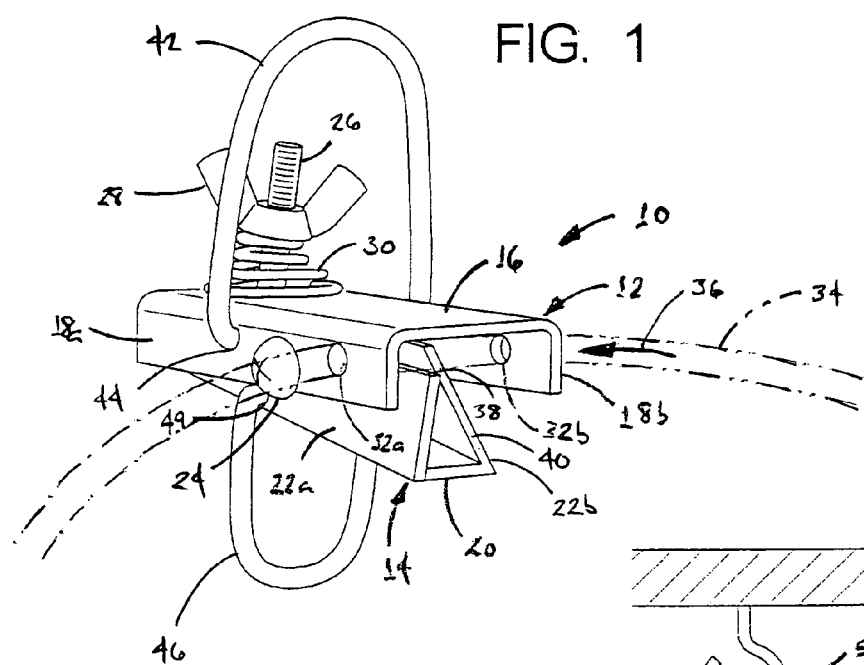
FIG. 1 is a perspective view of an automatic watering apparatus in accordance with the present invention.

FIG. 1 shows an automatic watering apparatus 10 in accordance with a preferred embodiment of the present invention. As can be seen, the apparatus includes upper and lower jaw members 12, 14. The upper jaw member has an inverted channel configuration, with a horizontal upper web portion 16 and parallel, depending wall portions 18a, 18b. The lower jaw member 14 also has a channel-shaped configuration, with a horizontal bottom web portion 20 and upwardly-extending wall portions 22a, 22b that extend parallel to and inside the depending wall portions 18a, 18b of the upper jaw member. The upper and lower jaw members are connected by a transverse bolt or pin 24 that forms a horizontal pivot axis, so that as the jaw members rotate about the pivot axis the wall portions thereof cooperate to develop a scissors-like action. As used herein, the terms "upper", "lower", and so on refer to the orientation that is shown in the drawings and as used for ease of understanding; however, it will be understood that the actual physical orientation may vary from that which is shown, e.g., the assembly may be employed in an orientation inverted from that shown in FIG. 2 and the components would consequently have a relationship inverted from that described herein.

The pivot bolt 24 is spaced somewhat from the longitudinal midpoint of the upper jaw member, towards a first end of the assembly that for ease of explanation will be referred to herein as the forward end. Proximate the opposite, rearward end of the assembly, the threaded shaft of a second bolt 25 extends vertically through the web portions of the two jaw members, the head 26 of the bolt being retained by the web of the lower jaw member and the threaded shaft thereof passing through an enlarged opening (not shown) in the web of the upper jaw member. An adjuster nut or wheel 28 is threaded onto the upper end of the bolt 25, with a compression spring 30 being mounted around the shaft of the bolt between the adjuster nut and the top of the web portion 16 of the upper jaw member. Tightening the adjuster nut 28 thus increases the compression of spring 30; this in turn forces the rearward ends of the upper and lower jaw members together, so that at the opposite, forward end of the assembly the jaw members are biased apart to an open position, as shown in FIG. 1.

Coaxially aligned openings 32a, 32b are formed in the wall portions 18a, 18b of the upper jaw member, proximate the junctions between the wall portions and the web portion 16, and are sized to receive flexible plastic tubing 34 having a predetermined diameter (e.g., $\frac{1}{8}$" or $\frac{3}{16}$" plastic tubing). The tubing is inserted through the openings 32a, 32b, in the direction indicated by arrow 36, so that it is positioned closely against the broad, flat lower surface of web portion 16. Positioned immediately below the tubing, in turn, is the upper edge 38 of the wall portion 22a of the lower jaw member, so that the edge 38 and web 16 form the two contact surfaces of a jaw area. As will be described in greater detail below, closing of the jaw area by the scissors-action jaw members causes the edge 38 of the wall portion to press against the tubing and pinch it closed against the web portion 16, thus restricting the flow of water through the tubing. The upper edge 40 of the opposite wall portion 22b is cut back at an angle so that only the one edge 38 contacts the tubing.

A pivoting bail 42 is mounted at the rearward end of the assembly, with its lower ends being received in cooperating bores 44 in the wall portions of the upper jaw member 12. A depending bail or hook member 46 is in turn mounted to the lower jaw member 14, the upper end thereof being secured to the walls of the lower jaw member by ends that are received in holes 49. The attachment points for both the bail and hook members lie well rearwardly of the horizontal pivot axis, on the side of bolt 24 opposite the jaw area and tubing.

b. Operation

The automatic watering apparatus of the present invention has the capacity to operate with both suspended containers such as hanging baskets and non-suspended containers such as planter boxes and pots.

Figure 2:
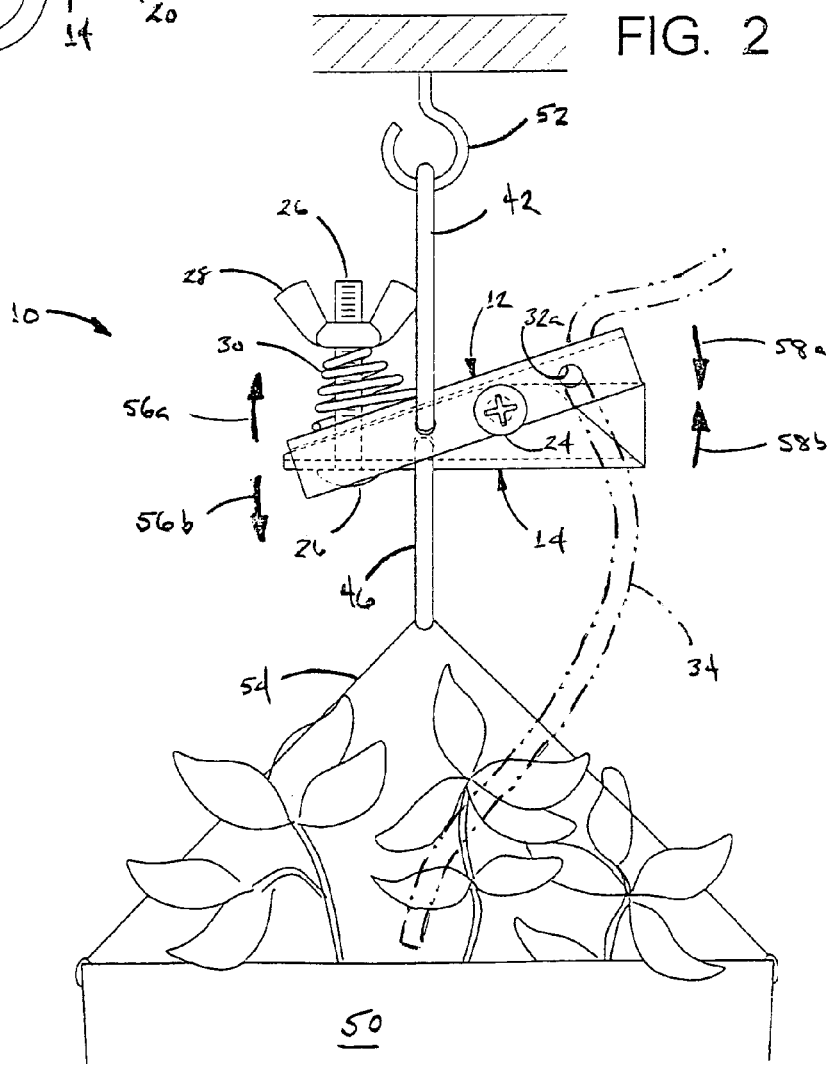
FIG. 2 is a first elevational, environmental view of the automatic watering apparatus of FIG. 1, showing the manner in which the apparatus is used with a hanging basket or other suspended container to provide a regulated flow of water to the plants therein.

Accordingly, FIG. 2 shows the apparatus 10 in use with a hanging basket 50. As noted above, both the upper bail 42 and depending bail 46 are positioned behind the pivot pin 24, i.e., to the left in FIG. 2. The bail suspends the assembly from a hook 52 or other fitting that is mounted to an overhanging support (e.g., an eave), while the hoop 54 or similar attachment on the basket is suspended from the hook portion 46 of the apparatus. The weight of the basket consequently exerts a tension through the hook and bail members 46, 42, exerting a spreading force at the rearward end of the apparatus as indicated by arrows 56a, 56b. This force resiliently compresses the compression spring 30, so that at the forward end the upper and lower jaw members pivot together to generate the scissors action described above, as indicated by arrows 58a, 58b. This in turn closes the jaw area, causing the upper edge 38 on the lower jaw member to compress the flexible tubing 34 against the web of the upper jaw member, thus pinching off flow through the tubing.

Figure 4:
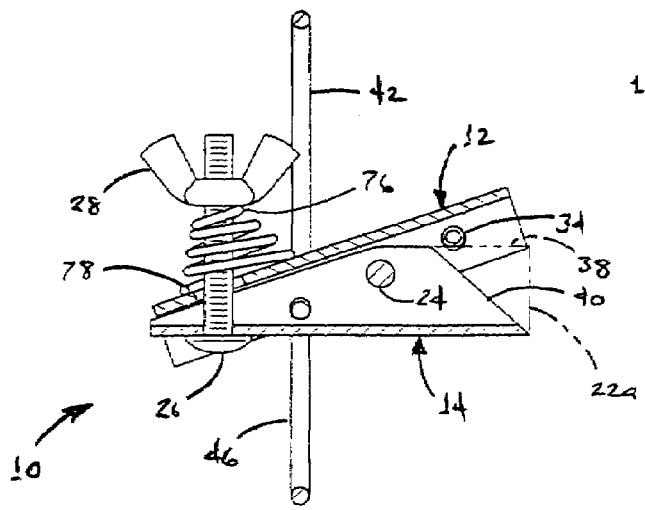
FIG. 4 is a side, cross-sectional view of the automatic watering apparatus of FIG. 1, showing the components and internal mechanism thereof in greater detail.
Figure 5:
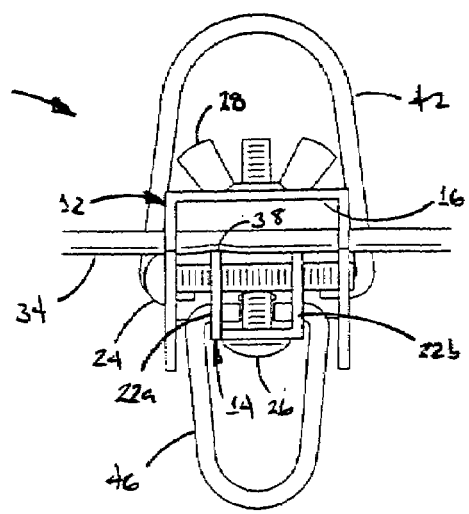
FIG. 5 is an end, elevational view of the automatic watering apparatus of FIG. 4, showing the manner in which the contact areas on the upper and lower jaw members define a jaw area that engages the flexible tubing that is routed through the apparatus.
Figure 6:
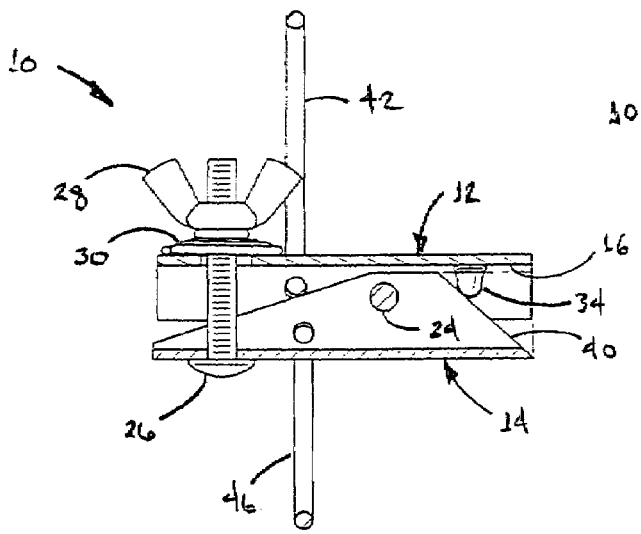
FIG. 6 is a side, cross-sectional view, similar to FIG. 4, showing the manner in which the jaw area of the apparatus pinches the flexible tubing closed in response to an increase in weight of the container.
Figure 7:
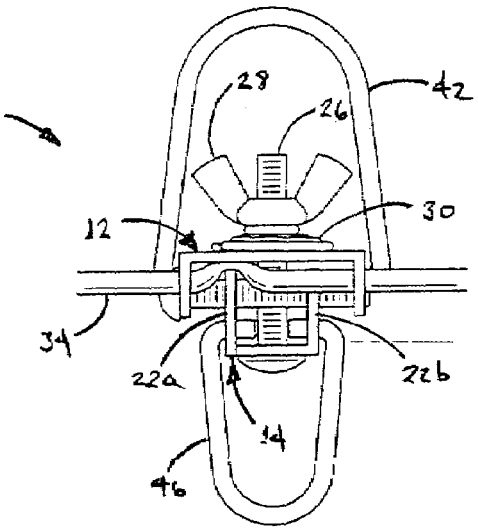
FIG. 7 is an end, elevational view, similar to FIG. 5, showing the relationship between the broad web of the upper jaw member and the narrow edge of the lower jaw member as the tubing is pinched closed.
Figure 8:
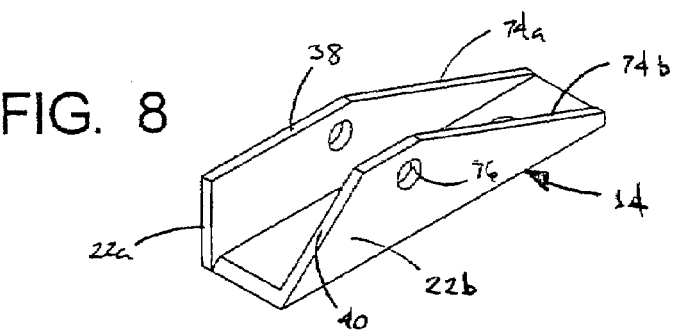
FIG. 8 is a perspective view of the lower jaw member of the automatic watering apparatus of FIG. 1, showing the structure thereof in greater detail.

The pinching action is more clearly shown in FIGS. 4–7. As can be seen in FIGS. 4–5, when the jaw area is in the initial, open position, the tubing 34 is expanded (by virtue of wall resilience and/or internal water pressure) so as to have an open interior passage through which water flows to the container. The tubing extends transversely across the broad web 16 and is contacted lightly (if at all) by the edge of wall 22a. Then, as is shown in FIGS. 6–7, an increase in weight (i.e., due to increased water/moisture in the container, causes the upper edge 38 of the wall to move towards web 16, pressing into the wall of the tubing and pinching the internal passage closed.

Resistance to the pivoting, pinching action of the jaw members is provided by the compression spring 30. The resistance can be selectively increased or decreased by tightening or loosening the adjuster nut 28 on shaft 25. The large-diameter (e.g., approximately 1") of the nut eases its operation, even for persons having arthritis or otherwise limited dexterity, and also aides in making very fine adjustments. Ease and accuracy of adjustment is also facilitated by the use of the narrow contact surface 38 (with the tubing being held stable by the broad surface of the web 16), as opposed to employing a pair of broad contact surfaces to compress the tubing.

As can be seen in FIG. 2, the flexible tubing 34 is routed from the openings 32a, 32b in the upper jaw member of the apparatus to the hanging basket that is suspended from the hook member 46. An increase in weight of the basket due to increased dampness of the soil will therefore increase the tension force that is exerted against the rearward ends of the jaw members, so that the jaw members rotate about the pivot axis to close the jaw area and compress the tubing, slowing or stopping the flow of water. Conversely, as the weight of the basket lessens due to water loss, the spring acts to counter-rotate the jaw members so that the pinching force is reduced and flow is re-established.

To set the device, the gardener attaches the hanging container as shown in FIG. 2, and manually adds water until an optimal dampness has been attained, taking into account the particular requirements of the plants that are contained therein. The adjuster wheel is then tightened/loosened until the flow of water from the discharge end of the tubing is just barely stopped. With the subsequent drying, the tension and therefore the pinching force on the tubing is lessened, and water passes through the partially constricted tubing and drips into the basket until the weight again corresponds to the optimal dampness. If at any point the gardener observes that the dampness of the soil is being maintained at a greater or lower level than desired, this is easily rectified by slightly tightening or loosening the adjuster wheel.

In this manner, the automatic watering apparatus of the present invention will keep the basket or other container properly watered on an indefinite basis without requiring attention from the gardener. Moreover, multiple containers can be supplied through individual water lines (e.g., branch lines from a main feeder tube), with the individual watering devices being set to maintain different levels of dampness as appropriate for the varieties of plants in their respective containers.

Figure 3:
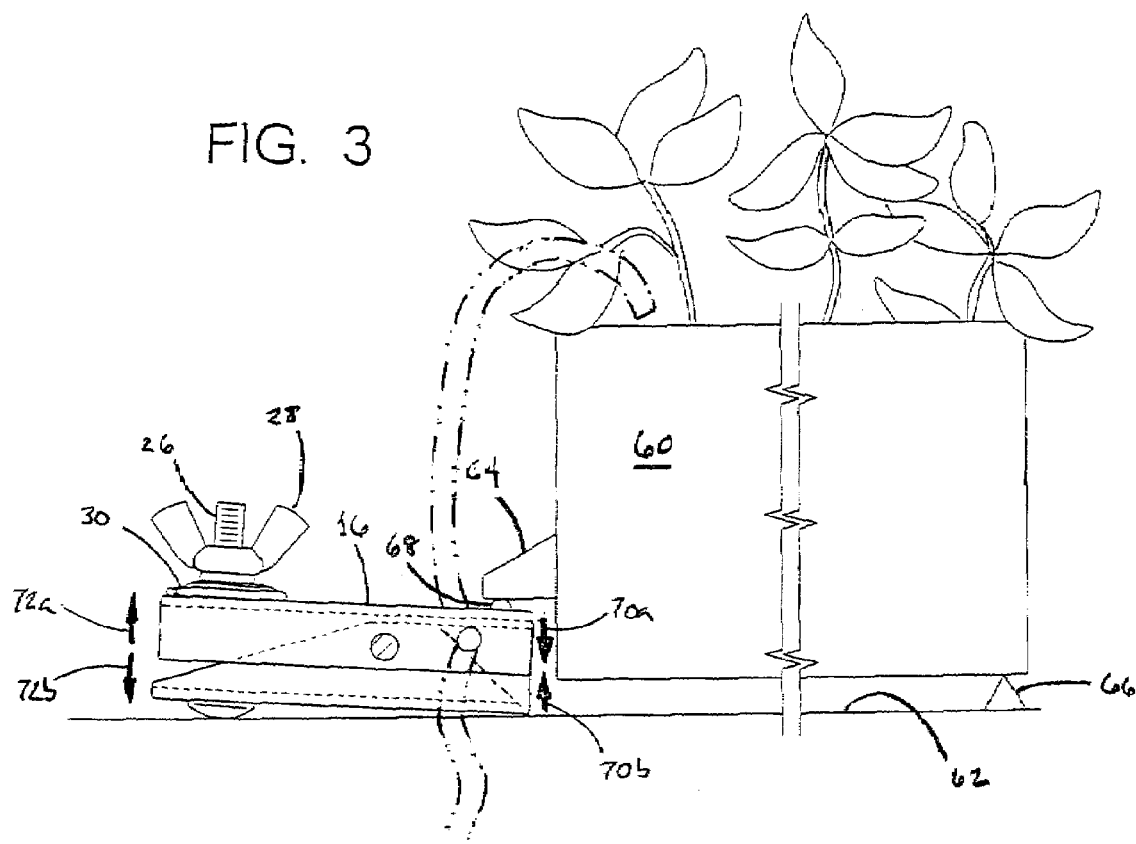
FIG. 3 is a second elevational, environmental view of the automatic watering apparatus of FIG. 1, showing the manner in which this is used with a planter box or other non-suspended container to provide a regulated flow of water to the plants therein.

FIG. 3 shows the automatic watering apparatus 10 being used with a planter box 60 or other non-suspended container that is supported by an underlying surface 62 (e.g., a patio or deck). In this installation, the bracket and hook members are not used and may be dispensed with. Instead, the weight of the planter box is borne vertically on the web 16 of the upper jaw member. Where the spacing between the bottom of the planter box and the underlying surface is sufficient, the forward end of the assembly 10 may simply be inserted in the gap; alternatively, as is shown in FIG. 3, a projecting bracket 64 may be installed on the end of the container for transferring the vertical load into the jaw member. The opposite end of the planter box is supported on a suitable fulcrum 66 that permits the box to pivot upwardly and downwardly with the working of the apparatus 10 (although in some installations the end of the box itself may serve as the fulcrum); a corresponding raised, radiused bearing surface 68 (e.g., a raised ridge or dome) is preferably formed or mounted atop the upper jaw member for similarly accommodating relative pivoting motion between the jaw member and the bracket 64.

The weight of the planter box or other container 60 resting on the upper jaw member of the watering apparatus consequently acts to force the forward ends of the jaw members together as indicated by arrows 70a, 70b, thereby closing the jaw area and developing the pinching action described above. In response, the jaw members spread apart at the opposite end, in the direction indicated by arrows 72a, 72b, compressing spring 30 in the same manner as described above. Adjustment is likewise accomplished in the same manner, by tightening or loosening adjuster nut 28 to increase or decrease the compression of spring 30.

The present invention thus provides an automatic watering apparatus that can be used in the same form with both suspended containers such as hanging baskets and non-suspended containers such as planter boxes.

c. Components

As is shown in the figures, the automatic watering apparatus 10 of the present invention is economically constructed of low cost, durable components and materials.

The upper and lower jaw members 12, 14 are suitably fabricated from aluminum or other metal stock. In the illustrated embodiment, the upper jaw member 12, with its web and depending walls, is suitably fabricated of aluminum channel cut to a suitable length (e.g., 1-inch wide by ½-inch deep aluminum channel, cut to a length of 2 inches) and then drilled or punched to form the bores and openings. The bores 32a, 32b are preferably sized to accommodate the maximum diameter of tubing with which the apparatus is intended to be used: For the majority of applications, ⅛" diameter flexible plastic tubing is eminently suitable, although it will be understood that other sizes may be employed in some embodiments.

The lower jaw member 14, in turn, is suitably constructed of aluminum channel that is sized somewhat smaller than a width of the upper jaw member (e.g., ½-inch wide by ⅜-inch deep channel). As can be seen in FIG. 5, the lower jaw member is suitably formed from somewhat smaller channel stock (e.g., ½-inch wide by ½-inch deep channel), by making a series of vertical and angled cuts at the forward and rearward ends. At the forward end, the vertical cut defines the forward edge of the wall 22a that extends upwardly to the edge 38 for pinching the tubing, the other edge 40 being formed by an angled cut. At the rearward end, both edges 74a, 74b are cut at a sloped angle, to avoid interference between the upper edges of the walls 22a, 22b and the web of the upper jaw member. The bore 76 for the pivot bolt is suitably formed by drilling or punching through the wall portions in a transverse direction.

Accordingly, both the upper and lower jaw members can be formed of a durable, low cost material—i.e., aluminum stock—with a series of quick cuts that are easily automated for production. It will be understood, however, that other suitable materials or techniques may be used, such as stamped, molded or cast parts, or non-metallic (e.g., plastic) components, for example.

The bolt 24 that forms the horizontal pivot axis may suitably be an ordinary bolt for being passed through the bores, with the bores being threaded so as to lock the bolt in place. It will be understood, however, that many other forms of pivot pins may be employed, such as a roll pin or plain rod, for example.

The vertical bolt 26, in turn, may suitably be a conventional bolt that extends through cooperating bores in the webs of the upper and lower jaw portions, with the head of the bolt being secured to the lower jaw portion. In the illustrated embodiment (constructed of stock having the exemplary dimensions noted above), the bolt 26 suitably has a length of about 1¼-inch, so that the end of its shaft projects above the upper jaw portion by about ½–¾-inch; for ease of production, the pivot and adjustment bolts may be identical pieces, e.g., 1¼×⁸⁄₃₂-inch machine screws.

As can be seen, the compression spring 30 that is mounted amount the bolt is preferably formed as a conical coil spring, having a comparatively small-diameter upper end 76 that fits under the hub of the adjuster nut 28 and a large-diameter lower end that bears against the upper surface of the web portion 16 of the upper jaw member. This configuration has the advantage of easily accommodating changes in the angle between the adjuster bolt/spring and the upper jaw member, as well as enabling the spring to collapse substantially flat when the mat is fully tightened, as shown in FIG. 3. Moreover, the component is durable and very economically sourced.

Figure 9:
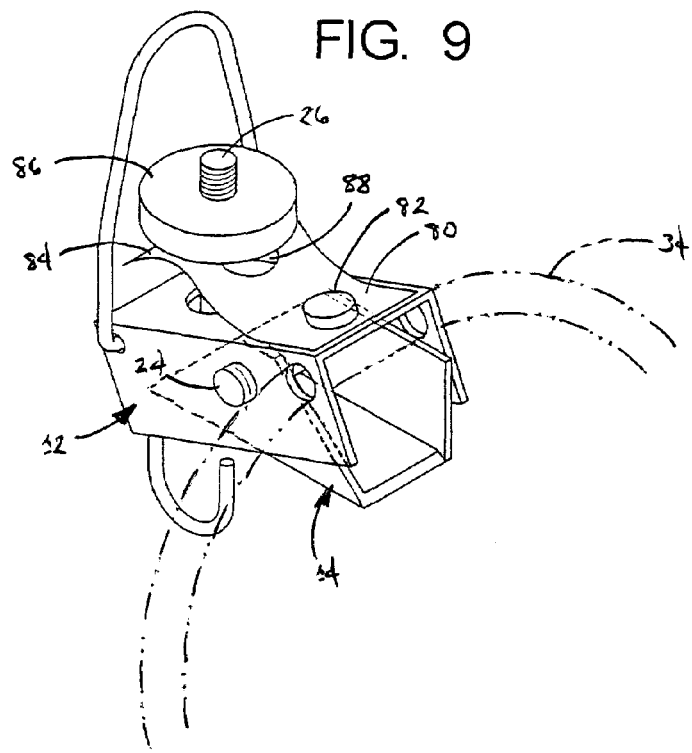
FIG. 9 is a perspective view of an automatic watering device in accordance with a second embodiment of the present invention, differing from that shown in FIGS. 1–4 in using a leaf rather than coil compression spring.

Alternatively, as shown in FIG. 9, the compression spring may be a leaf spring having a somewhat S-shaped configuration. The depressed end 80 of the spring is mounted atop the web portion 16 of the upper jaw member by a screw 82 or other suitable fastener or attachment (e.g., a rivet or an adhesive). The raised end 84 of the spring is positioned against the bottom of an adjuster wheel 86 and is forked, with a slot opening 88 for accommodating the shaft of the adjuster bolt 26. The raised end of the spring is preferably somewhat downcurved so as to form a convexly curved upper surface in the area that bears against the underside of the adjuster wheel. This has the advantage of forming a sliding interface that maintains a more-or-less constant area of contact between the adjuster wheel and raised end of the spring during pivoting movement of the jaw members, thus avoiding binding or increased friction between the adjuster wheel and the spring. It will be understood that in other embodiments still different forms or configurations of springs may be used, such as an elastomeric piece or live hinge, for example.

The adjuster nut may be a simple wing nut as shown in FIGS. 1–7 or it may be a wheel formed of a cut, stamped or molded material (e.g., aluminum or plastic) as shown in FIG. 9, with a threaded bore for engaging the shaft of the bolt. As noted above, the adjuster nut/wheel preferably has a relatively large diameter (e.g., 1″) for ease of adjustment. Finally, the bail members are suitably formed of steel wire bent to shape over a form, although again it will be understood that other suitable materials may be used.

d. Water Supply Tubing

Figure 10:
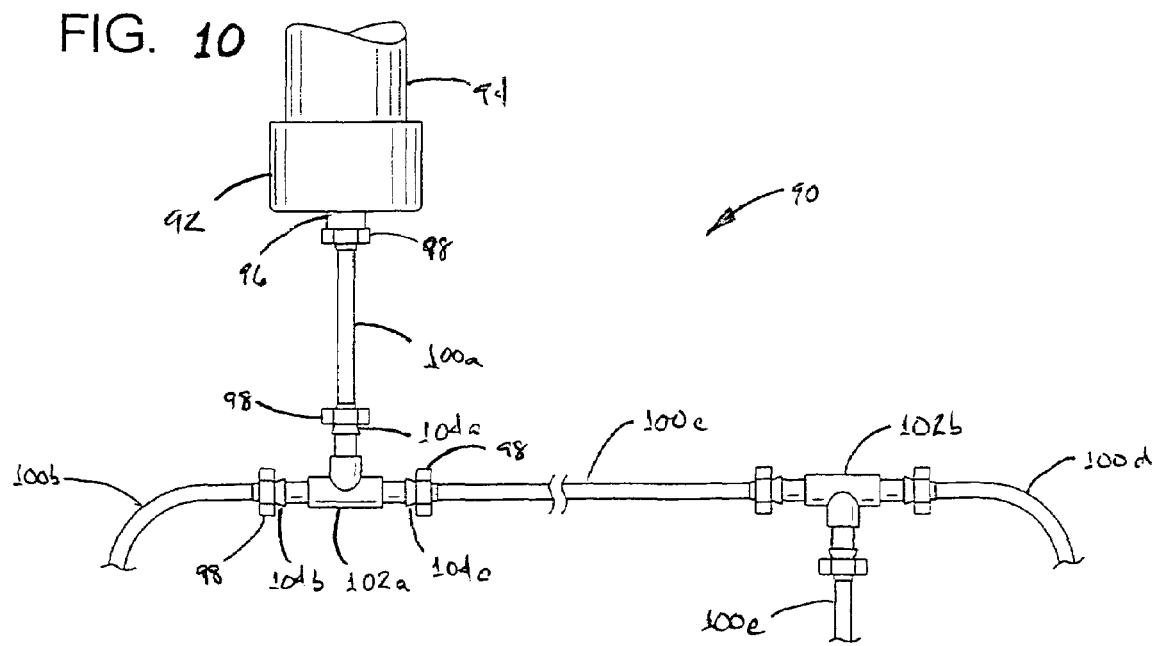
FIG. 10 is an elevational view of flexible tubing and connectors for supplying water from a conventional faucet to a plurality of automatic watering devices in accordance with the present invention.

FIG. 10 shows a system 90 of water supply tubing that is eminently suited to use with the automatic watering devices described above. It will be understood, however, that other forms of tubing and connectors may be utilized in the present invention as well.

As can be seen, the system 90 includes a screw-on reducer 92 that attaches to the outlet 94 of a conventional garden hose faucet. The reducer has an outlet nipple 96 that is sized to receive the flexible tubing (e.g., ⅛-inch plastic tubing) therein. The nipple is formed with an external taper, over which a nut 98 is threaded and tightened to lock the tubing in place; the reducer is preferably formed of resilient plastic so that it will compress against the tubing as the preferably metal nut is tightened.

The other end of the initial tubing section 100a is attached to a plastic "T" connector 102 having nipple connectors 104a–c similar to that of the reducer and over which additional nuts 98 are threaded is the same manner to secure the tubing. Tubing segments 100b–c are attached to the other legs of the "T" to form supply lines that are routed to desired locations in the garden. Additional "T"s and segments (e.g., 100d–e) are then installed proximate the containers themselves, from which the branch segment is led through the watering device (i.e., see tubing 34 above) and to the plant.

It is to be recognized that various alterations, modifications, and/or additions may be introduced into the constructions and arrangements of parts described above without departing from the spirit or ambit of the present invention.

What is claimed is:

1. An apparatus for automatically watering a plant in a container by regulating a flow of water to said container through flexible tubing, said apparatus comprising:
    upper and lower jaw members interconnected by a substantially horizontal pivot axis;
    opposing contact surfaces on said upper and lower jaw members that define a jaw area receiving said flexible tubing therein;
    an adjustable spring that resiliently biases said contact surfaces apart so as to open said jaw area; and
    said container suspended from said lower jaw at a location offset from said pivot axis on a side of the pivot axis opposite said jaw area;
    so that in response to an increase in weight of said container due to water accumulation said members are rotated about said pivot axis so as to close said jaw area and pinch said tubing closed, thereby restricting said flow of water therethrough, and so that in response to a decrease in weight of said container due to water loss said members are counter-rotated by said spring so as to open said jaw area and allow said tubing to expand open, thereby reestablishing said flow of water therethrough.

2. The apparatus of claim 1, wherein said opposing contact surfaces comprise:
    a first, relatively broad surface for holding said flexible tubing generally flat thereon; and
    a second, relatively narrow edge for pressing into a wall of said flexible tubing so as to pinch said tubing closed.

3. The apparatus of claim 2, wherein said first, relatively broad surface comprises a surface of a generally horizontally-extending web portion of one of said jaw members, and wherein said second, relatively narrow surface comprises an edge of a generally vertically-extending wall portion of the other of said jaw members.

4. The apparatus of claim 3, wherein said upper jaw member comprises a downwardly facing channel-shaped member having a generally horizontally-extending web portion and first and second downwardly-extending wall portions, and wherein said lower jaw member comprises an upwardly facing channel-shaped member having a generally horizontally-extending web portion and first and upwardly extending wall portions that are positioned generally adjacent and parallel to said downwardly-extending wall portions of said upper jaw member.

5. The apparatus of claim 4, wherein said pivot axis comprises:
    a generally horizontal pivot pin that extends through cooperating bores in said parallel-extending wall portions of said channel-shaped members.

6. The apparatus of claim 4, wherein said first, relatively broad surface comprises a lower surface of said web portion of said downwardly-facing channel-shaped member, and wherein said second, relatively narrow surface comprises an upper edge of one of said wall portions of said upwardly-facing channel-shaped member.

7. The apparatus of claim 6, wherein said upper jaw member further comprises:
    first and second substantially coaxial bores formed through said wall portions of said downwardly facing channel-shaped member proximate said web portion thereof, for passage of said flexible tubing therethrough so that said tubing is held in said jaw area closely adjacent said lower surface of said web portion.

8. The apparatus of claim 1, wherein said adjustable spring comprises:
    a compression spring operatively interconnecting said upper and lower jaw members on a side of said pivot axis opposite said jaw area, so that compression of said spring increases in response to closing of said jaw area.

9. The apparatus of claim 8, further comprising:
    means for selectively adjusting compression of said spring so as to adjust resistance of said spring to closing of said jaw area.

10. The apparatus of claim 9, wherein said means for selectively adjusting compression of said spring comprises:
    an elongate connector member having a lower end that is mounted to said lower jaw member on a side of said pivot axis opposite said jaw area and a threaded upper end that projects above said upper jaw member; and
    a manually-rotatable adjuster member in threaded engagement with said upper end of said connector member;
    said spring being mounted around said upper end of said connector member generally between said adjuster member and a surface of said upper jaw member, so that compression of said spring is selectively increased by rotating said adjuster member in a first direction and decreased by rotating said adjuster member in an opposite direction.

11. The apparatus of claim 10, wherein said connector member comprises a bolt having its head mounted to said lower jaw member, and wherein said adjuster member comprises an adjuster nut in engagement with said threaded end of said bolt.

12. The apparatus of claim 10, wherein said compression spring comprises a coil spring.

13. The apparatus of claim 10, wherein said compression spring comprises a leaf spring.

* * * * *